April 27, 1954  E. W. MILLER  2,676,519
METHOD OF GENERATING AND CUTTING OFFSET FACE GEARS
Filed Aug. 20, 1949
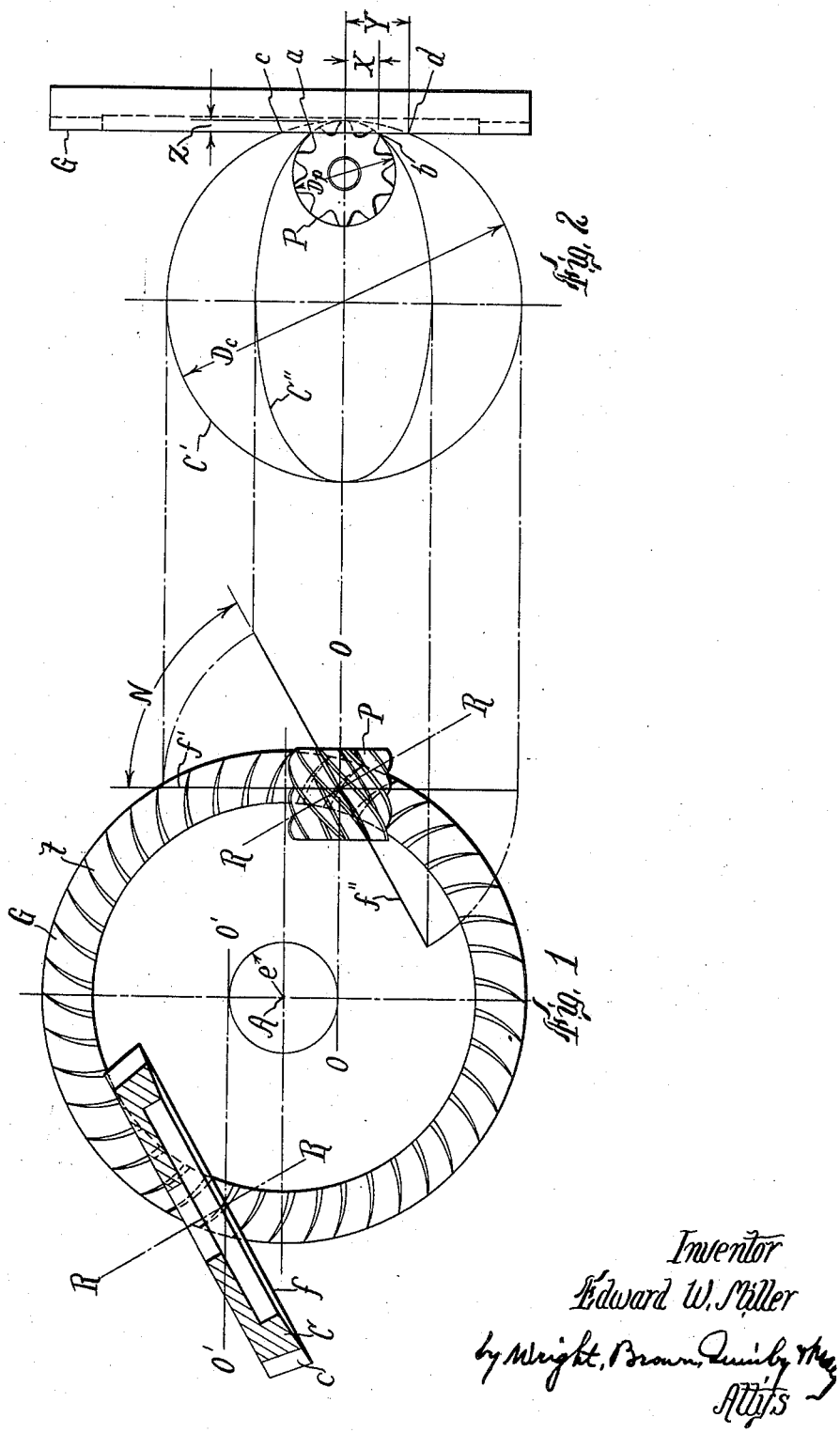
Inventor
Edward W. Miller Patented Apr. 27, 1954

2,676,519

UNITED STATES PATENT OFFICE 2,676,519

METHOD OF GENERATING AND CUTTING OFFSET FACE GEARS

Edward W. Miller, Springfield, Vt., assignor to The Fellows Gear Shaper Company, Springfield, Vt., a corporation of Vermont Application August 20, 1949, Serial No. 111,382

9 Claims. (Cl. 90—1.6)

This invention relates to the production of face gears by the molding generating process employing a gear shaper cutter. Its object is to produce such gears designed to mesh with pinions in offset axial relation by the generating cutting action of gear shaper cutters which are substantially larger than the pinions with which the face gears are designed to mesh and are fed relatively to the gear blanks operated on in paths offset from the axes of the gears by amounts equal to the offsetting of the pinions with which the gears to be cut are respectively designed to mesh. A more specific object, constituting a part of the precedently stated general object, is to provide a method of setting a comparatively large gear shaper cutter in a relation to the gear blank to be cut such that the projection of its circumference on a plane perpendicular to the axis of the pinion designed to mesh with the gear will substantially coincide with, or be substantially of the same mean radius as the pinion, as to that part of the circumference of the cutter which is momentarily in penetrating relation with the gear blank.

For the purposes of this description a face gear is defined as one which is provided with a circular series of teeth in one end face surrounding the axis of the gear, such teeth being suitably formed to mesh with pinions or gears of cylindrical character. Usually the crests of such teeth and the bottoms of the intermediate spaces are located in planes perpendicular, or approximately so, to the axis of the gear; but the definition comprehends also gears in which the teeth are more or less inclined to the axis.

A gear shaper cutter is defined as a shaping cutter having teeth arranged similarly to the teeth of a gear or pinion, but provided with cutting edges at one end and side clearances back from the end on side and top faces.

The principles of the invention are described in the following specification and illustrated by the accompanying diagrammatical drawings, in which:

Fig. 1 is a plan view of a face gear and side elevation of a helical pinion meshed therewith in offset relationship, and shows also in cross section a gear shaper cutter disposed in accordance with the principles of the invention to generate teeth in the gear conjugate to the pinion;

Fig. 2 is a side view of the gear and pinion couple shown in Fig. 1 and includes a diagram illustrating the mode of establishing the angular relationship, of a cutter substantially larger than the pinion and having many more teeth, to the gear for generating teeth in the gear conjugate to the pinion teeth.

In these drawings, G represents a face gear having teeth $t$ in a marginal zone coaxial with the axis A of the gear, and P represents a helical pinion with which the gear is designed to mesh and be conjugate when the axis O—O of the pinion is offset a distance $e$ from the axis A of the gear. In this illustration the teeth $t$ are established on a pitch plane perpendicular to the gear axis and the pinion axis O—O is parallel to that plane. The teeth $t$ are inclined or skewed with respect to the radii of the gear on which they are respectively located and are curved lengthwise, i. e., between the inner and outer circumferences of the zone in which they are contained. Such skew angles and curvatures of the teeth vary in different face gears according to the distance of offsetting and the helix angles of the pinions designed to run with the gears. Such gears may be designed for meshing with spur pinions as well as helical pinions, and by definition in this case a spur pinion is considered to be a helical pinion of zero helix angle.

C designates a gear shaper cutter of larger diameter than the pinion P and having teeth $c$ with cutting edges lying in the end face $f$ of the cutter, the outlines of such teeth in planes perpendicular to the axis R—R of the cutter being similar to gear teeth having the same normal circular pitch and same pressure angle in the normal plane as the teeth of the pinion P.

It is important practically that the cutters be as large and possess as many teeth as possible within the limits above indicated and those necessitated by avoidance of interference, in order to lengthen the wearing life of the cutter, both as to the time during which it can be used before needing to be sharpened, and its ultimate life.

I have discovered that a cutter much larger than the pinion designed to mesh with a given face gear can be used to cut gears conjugate to such a pinion by being set at a proper angle to a line offset from the gear axis a distance equal to the offsetting of the pinion axis, and have devised a method of establishing the value of such an angle for any given cutter with respect to any given pinion. This discovery and method, and the combination therewith of the further steps of cutting the gear by effecting relative transverse (or cutting feed) between the cutter and gear along such a line, while holding the cutter at the established angle, and rotating the cutter and gear simultaneously around their respective axes at appropriate speeds and in appropriate directions, constitute the present invention.

The angle at which the cutter is set in the performance of this method is that which causes the projection of the circumference of the cutter on a plane perpendicular to the path of cutting traverse to be an ellipse, of which the shortest radii of curvature approximate closely to the length of the radius of the pinion. A graphic mode of determining such angle is exemplified by the diagrams in the drawing.

A line $f'$, representing the cutting end face of the cutter, and of the same length as the diameter of that end face, is drawn on Fig. 1 across the pinion P perpendicular to the axis O—O thereof and symmetrically located with respect to the axis. This representation of the end face is projected on Fig. 2 as a circle $C'$ tangent to the circumference of the pinion at the point of deepest penetration of the pinion into the gear. The pinion circumference crosses the plane of the tooth crests of the gear at the points $a$ and $b$, and the circumference $C'$ crosses the same plane at the points $c$ and $d$. The circle $C'$ is rotated about its diameter in common with the pinion until the point $c$ coincides with point $a$ and point $d$ coincides with point $b$, its projection on a plane perpendicular to the pinion axis (the plane of Fig. 2), being an ellipse $C''$, which approximately coincides with the circumference of the pinion between the points $a$ and $b$. The plane of the circle when rotated to the extent thus described is indicated by the line $f''$ in Fig. 1, and the angle through which it is rotated is designated N. The ratio of the chord $ab$ to the chord $cd$ is the cosine of angle N. Thus the angle at which the cutter is set with respect to the path of cutting travel is the complement of the angle N, i. e., 90°—N, and the ratio of $a$—$b$ to $c$—$d$ is the sine of the angle 90°—N.

A general formula for thus setting the cutter is derived as follows: Let Dc represent the diameter of the cutter; Dp the diameter of the pinion; X the half length of the chord $ab$; Y the half length of the chord $cd$; and Z the depth to which the pinion and cutter penetrate into the gear. Then, by the formula for the chord of a circle, $$X = \sqrt{Z(Dp-Z)}$$
$$Y = \sqrt{Z(Dc-Z)}$$

and since $$\cos N = \frac{X}{Y}$$

$$\cos N = \sin 90° - N = \frac{\sqrt{Z(Dp-Z)}}{\sqrt{Z(Dc-Z)}}$$

In putting the invention into practice then, the cutter is located relative to the face gear blank with a diameter of its cutting face perpendicular to the zone of the blank in which teeth are to be cut and on a line O'—O' offset a distance $e$ from the axis of the gear blank equal to the prescribed offsetting of the pinion axis, and with the plane of its cutting face inclined to the line O'—O' at an angle of which the sine has the value determined by the foregoing formula. While the cutter is maintained in this angular relationship, a relative feed movement is effected between the cutter and work gear blank along the line O'—O', and the cutter and blank are simultaneously rotated about their respective axes at a speed ratio corresponding to that of a gear of the same pitch diameter of the cutter rotating in mesh with a face gear like the gear to be generated, while being displaced bodily along the line O'—O'.

Either a spur or a helical cutter of large diameter can be positioned and operated according to the precedently described method to generate the teeth of face gears that will mesh with spur pinions, or those that will mesh with helical pinions, of smaller diameter than the cutter. The correct degree of inclination and/or curvature of the gear teeth to be conjugate to any specific pinion is determined by an increment of angular movement imparted to the cutter, based on the angular relation of the cutter teeth and pinion teeth to their respective axes.

In the diagram of Fig. 2, the circumferences of pinion and cutter have been represented as their outside circumferences. It is not necessary, however, that these circumferences be used in determining values of X, Y and Z, but other circumferences, such as the pitch circles may be used, provided corresponding circumferences of both which penetrate sufficiently into the gear are selected. Also the excess length of the cutter teeth addenda necessary to cut the tooth spaces of the face gear teeth deeply enough to avoid interference with the crests of the pinion teeth has been ignored. It may be understood that the excess cutter teeth addenda extend beyond the circumference having the diameter Dc represented in Fig. 2.

The present invention does not involve any specific machine or mechanism for rotating and relatively traversing the cutter and gear blank, but can be carried out in conjunction with mechanical apparatus heretofore developed. In case structural characteristics of the apparatus limit the inclination at which the cutter can be placed with respect to the path of cutting traverse, then the formula enables the size of the largest cutter which can be used within such limitations to be determined.

What I claim is:

1. The method of generatively cutting a face gear to mesh with a prescribed pinion when the axes of the gear and pinion are offset, which comprises providing a gear shaper cutter of larger diameter than such pinion, locating the cutter adjacent to and clear of a face gear blank with a diameter of the cutter perpendicular to the gear blank and to a line parallel to the blank and offset from the axis thereof a distance equal to the prescribed offsetting between the face gear and pinion axes, inclining the gear to such offset line at an angle such that the projection of the circumference of the end face of the cutter on a plane perpendicular to the said offset line is of substantially the same mean radius as the pinion as to so much of the cutter circumference as intersecting the zone of the gear blank wherein teeth are to be cut, effecting a relative travel between the cutter and gear blank along the said offset line in a path which causes teeth at one side of the cutter to penetrate into the face of the gear blank deeply enough to generate teeth therein, while maintaining the cutter at the same oblique angle to said line, and rotating the cutter and gear blank about their respective axes.

2. The method of generating and cutting a gear blank to mesh with a prescribed pinion, of which the axis is offset from the axis of the gear, which comprises providing a gear shaper cutter of larger diameter than the prescribed pinion, effecting a relative cutting travel between such cutter and a gear blank in a path offset from the axis of the gear blank a distance equal to the prescribed offsetting of the pinion and so located that the teeth of the cutter at one side thereof will penetrate an annular zone of the gear blank, establishing and maintaining the cutter in inclined relation to such path at an angle of which the sine is substantially equal to the ratio between the chord of so much of the pinion circumference as extends into mesh with the face gear, and the chord of so much of the cutter circumference as penetrates into the gear blank, and rotating the cutter and blank about their respective axes in directions and at speeds corresponding to those of a cylindrical gear like the cutter running in mesh with a face gear like that being cut while being displaced along a path corresponding to such offset line at the rate of the relative travel.

3. The method of setting a gear shaper cutter to generate teeth in a face gear blank conjugate to the teeth of a pinion smaller than the cutter designed to mesh with the gear when its axis is offset from the axis of the gear, which comprises locating such gear shaper cutter in relation to a gear blank such that a diameter of the cutter is perpendicular to the face of the blank in which teeth are to be cut and intersects a line offset at the same distance from the axis of the cutter as the prescribed offset distance of the pinion axis from the cutter axis, and inclining the gear at an oblique angle to said line such that the projection of its circumference on a plane perpendicular to the said line is an ellipse of which the curvature in that portion which intersects the zone of the gear blank wherein teeth are cut closely approximates the curvature of the circumference of the pinion.

4. The method of generating teeth in a face gear blank conjugate to the teeth of a pinion which is designed to mesh with the gear when its axis is offset from the axis of the gear which consists of employing a gear shaper cutter of a diameter greater than the diameter of the pinion, locating such gear shaper cutter in relation to the face gear blank so that a diameter of the cutter is perpendicular to the face of the blank in which teeth are to be cut and intersects a line offset at the same distance from the axis of the cutter as the prescribed offset distance of the pinion from the gear axis, and disposing the cutter at an angle to said line so that the projection of its circumference on a plane perpendicular to the said line is an ellipse of which the curvature in that portion which intersects the zone of the gear blank wherein teeth are cut closely approximates the curvature of the circumference of the pinion, rotating the cutter and blank in timed relation and feeding the cutter across the blank in the direction of said offset line.

5. The method of forming a gear blank to mesh with a prescribed pinion, the axis of which is offset from the axis of the gear which comprises providing a cutter of larger diameter than the prescribed pinion, effecting a relative cutting travel between such cutter and a gear blank in a path offset from the axis of the gear blank a distance equal to the prescribed offsetting of the pinion and so located that the teeth of the cutter will penetrate an annular zone of the gear blank, establishing and maintaining the cutter in inclined relation to such path at an angle at which the sine is substantially equal to the ratio between the chord of so much of the pinion circumference as extends into relation with the gear, and the chord of so much of the cutter circumference as penetrates into the gear blank, and rotating the cutter and blank about their respective axes at directions and at speeds corresponding to those of a cylindrical gear similar to the cutter running in mesh with a gear like that being cut while said relative cutting travel is being effected.

6. The method of forming teeth in a gear blank conjugate to the teeth of a pinion, which pinion is designed to mesh with the gear when its axis is offset from the axis of the gear which consists of employing a cutter of a diameter greater than the diameter of the pinion, locating such cutter in relation to the gear blank so that a diameter of the cutter is at an angle to the face of the blank in which teeth are to be cut and intersects a line offset at the same distance from the axis of the cutter as the prescribed offset distance of the pinion from the gear axis and disposing the axis of the cutter at an angle to said line so that the projection of its circumference on a plane perpendicular to the said line is an ellipse of which the curvature in that portion which intersects the zone of the gear blank wherein teeth are formed closely approximates the curvature of the circumference of the pinion, rotating the cutter and blank in timed relation and feeding the cutter across the blank in the direction of said offset line.

7. The method of forming a face gear to mesh with a pinion of a given diameter, the axis of which pinion lies along a given line with respect to the axis of the face gear which comprises providing a circular cutter of greater diameter than the diameter of said pinion, disposing such cutter in relation to the gear blank so that a diameter of the cutter is at an angle to the face of the gear blank to be cut and intersects said aforementioned line, inclining the axis of rotation of said cutter in intersecting relation to said line so that the projection of its circumference on a plane perpendicular to the said line is an ellipse of which the curvature in that portion which intersects the zone of the gear blank whereon teeth are cut closely approximates the curvature of the circumference of the pinion, rotating the cutter and blank in timed relation and feeding the cutter across the blank in the direction of said line.

8. The method of forming teeth in a gear blank conjugate to the teeth of a pinion, which pinion is designed to mesh with the gear when its axis is offset from the axis of the gear which consists of employing a cutter of a diameter greater than the diameter of the pinion, locating such cutter in relation to the gear blank so that a diameter of the cutter is at an angle to the face of the blank in which teeth are to be cut and intersects a line offset at the same distance from the axis of the cutter as the prescribed offset distance of the pinion from the gear axis and disposing the axis of the cutter at an angle to said line so that the projection of its circumference on a plane perpendicular to the said line is an ellipse of which the curvature in that portion which intersects the zone of the gear blank wherein teeth are formed closely approximates the curvature of the circumference of the pinion, rotating the cutter and blank in timed relation and effecting a relative feeding movement between said cutter and blank in the direction of said offset line.

9. The method of forming a face gear to mesh with a pinion of a given diameter, the axis of which pinion lies along a given line with respect to the axis of the face gear which comprises providing a circular cutter of greater diameter than the diameter of said pinion, disposing such cutter in relation to the gear blank so that a diameter of the cutter is at an angle to the face of the gear blank to be cut, inclining the axis of rotation of said cutter to said line so that the projection of its circumference on a plane perpendicular to the said line is an ellipse of which the curvature in that portion which intersects the zone of the gear blank whereon teeth are cut closely approximates the curvature of the circumference of the pinion, rotating the cutter and blank in timed relation and feeding the cutter and blank relatively in the direction of said line.

References Cited in the file of this patent

UNITED STATES PATENTS

| Number | Name | Date |
| --- | --- | --- |
| 2,308,891 | Miller | Jan. 19, 1943 |
| 2,579,422 | Handy et al. | Dec. 18, 1951 |